Patented June 30, 1936

2,046,281

UNITED STATES PATENT OFFICE 2,046,281

COMPOSITION

Charles Sterling Webber, Springfield, and Elbert A. Wilson, Longmeadow, Mass., assignors to The Fiberloid Corporation, Indian Orchard, Mass., a corporation of Massachusetts No Drawing. Application February 6, 1934, Serial No. 709,988

1 Claim. (Cl. 106—40)

This invention relates to improvements in compositions of matter and is directed more particularly to the provision of compositions of matter in which certain cellulose derivatives are combined with a compatible plasticizer containing certain esters of phthalic acid, with or without other substances such as addition agents, to provide improved compositions which are desirable for use in the plastic and analogous arts. The compositions of this invention are particularly advantageous for use in the manufacture of sheets, rods, tubes, molding compounds, wrapping tissues, laminated glass, artificial silk and leather, varnishes or lacquers, paper coatings and the like.

The principal object of this invention is the provision of cellulose derivative compositions which are permanently tough, transparent and clear and which are stable under the exposure of actinic rays. The compositions of this invention are especially suitable for lamination with one or more sheets of glass so that any scattering of glass particles which might be caused by subjecting the composite to a sudden shock is minimized.

Another object of this invention is the provision of a plastic composition that has enhanced strength at freezing and sub-freezing temperatures such that a glass composite containing the composition will not scatter at any temperature encountered in winter weather.

It is a further object of this invention to provide a cellulose derivative composition which is capable of being readily molded at relatively low temperatures and pressures so that it may be easily laminated with an article of glass. That is to say, the plastic composition of this invention has the capacity to readily flow to conform to the contour of the glass even though the latter may be as irregular as common drawn sheet glass, so that as a result strains that would otherwise be set up in the composite upon cooling are eliminated.

Still another object of this invention is the provision of a composition of matter which may be flowed under pressure onto the surface of a cloth, screen, or the like, and even into the interstices of a cloth, screen, or the like, to form a continuous sheet suitable for artificial leather and the like. Various and other objects of the invention will readily appear to those skilled in the art to which it pertains as the composition is disclosed.

According to this invention, cellulose organic esters such as cellulose acetate or cellulose nitrate are combined or mixed with a compatible plasticizer, with or without a common solvent for both, and with or without other useful additional agents.

Cellulose derivatives have long been used in the plastic arts and it has also been recognized that for satisfactory results it is necessary to mix with the cellulose some plasticizing or conditioning agent, such as alpha-chlor naphthalene, ethyl toluene sulphonamide, triphenyl phosphate and the like, for their plastic-inducing properties in an otherwise brittle-base material.

However, it is a fact that most of these plasticizing agents are less effective at low or freezing temperatures since the plasticizing agent is super-cooled below its congealing point much the same as glass is a super-cooled liquid. Such a plastic therefore has the glass-like property of being fragile and, when subjected to a sudden shock, is bound to shatter. This, of course, is a decided disadvantage if the plastic is to be used in a composite with glass, particularly if the composite is to be employed in motor vehicles and the like. In winter weather, at low and freezing temperatures, the value of the prior art cellulose-glass composite, commonly known as "non-shatterable" glass, tends to be dissipated.

In providing the composition of this invention, two or more plastic-inducing substances are added to a cellulose organic ester, such as cellulose acetate, in such proportions that the congealing point of the combined plasticizers is appreciably lower than that of either of the plasticizers alone. It is most desirable, of course, to use a mixture of two or more plasticizers which has the lowest freezing point possible, that is, a eutectic mixture.

We have found that esters of phthalic acid are most suitable for this purpose. That is to say, eutectic mixtures of two or more phthalic acid esters not only are capable of serving well their plastic-inducing function at ordinary temperatures but they have a low congealing point so that the mixture will readily flow at relatively low temperatures.

In one preferred form of the invention, there is added to the cellulose derivative, such as cellulose acetate, a mixture of from approximately 35 to 60 parts by weight of dimethyl phthalate and from approximately 60 to 35 parts by weight of diethyl phthalate, between which lies the eutectic mixture. This mixture has been found to be particularly satisfactory since the freezing point-composition curve for mixtures of diethyl phthalate and dimethyl phthalate shows the maximum depression of the freezing point between these two compositions.

We have found that the mechanical strength of such a plastic composition as has just been described, whether or not it be combined with glass in a composite, is greatly enhanced at freezing or sub-freezing temperatures as distinguished from a plastic composition containing but one of the above two plasticizing agents, that is either dimethyl phthalate or diethyl phthalate.

Of course, eutectic mixtures of other esters of phthalic acid may be formed, such as dimethyl phthalate-dimethoxy ethyl phthalate comprising from 40 to 60 parts of dimethyl phthalate and from 60 to 40 parts of dimethoxy ethyl phthalate. Also, mixtures of dimethyl phthalate with dipropyl phthalate, dibutyl phthalate, diethoxyethyl phthalate, methyl methoxy ethyl phthalate, or methyl ethoxy ethyl phthalate would serve satisfactorily in the composition of this invention. A mixture of dimethyl phthalate with ethyl ester of methyl carboxy methyl phthalate or beta acetyl oxyethyl beta hydroxy ethyl phthalate would likewise form eutectic compositions which would function in a cellulose derivative plastic in a like manner.

In any event, according to the preferred form of the invention, it is desirable that from 75 to 100 parts by weight of a mixed plasticizer consisting of two or more esters of phthalic acid be added to approximately 100 parts of a cellulose organic ester. The freezing or congealing point of each component of such mixtures is substantially lowered so that, as a result, a stronger, and therefore more desirable, plastic is produced. Thus it is possible to safely use cellulosic compositions in laminated glass composites at freezing or sub-freezing temperatures.

However, it is desired to point out that any one of the above mixed plasticizers will serve their novel function provided the relative proportions of the respective components are such that the freezing point of the mixture is within what may be called "a eutectic range". That is to say, it is not desired to be limited to only those specific proportions of these esters of phthalic acid which have the freezing point of the eutectic mixture, since mixtures thereof which have freezing points within, say, ten degrees of the freezing point of the eutectic mixture have been found to satisfactorily produce the desired results.

While we have described our invention in great detail and with respect to preferred forms thereof, we do not desire to be limited to such detail and preferred forms, since many changes may be made without departing from the spirit and scope of the invention. What we desire to claim and secure by Letters Patent of the United States is:

As a new article of manufacture, a plastic composition for use in laminated safety glass comprising cellulose acetate and a eutectic mixture of diethyl phthalate and dimethyl phthalate.

CHARLES STERLING WEBBER.
ELBERT A. WILSON.